May 16, 1961     J. M. SCHWARTZ ET AL     2,984,155
VARIABLE MAGNIFICATION AFOCAL OPTICAL SYSTEM
Filed Dec. 28, 1959

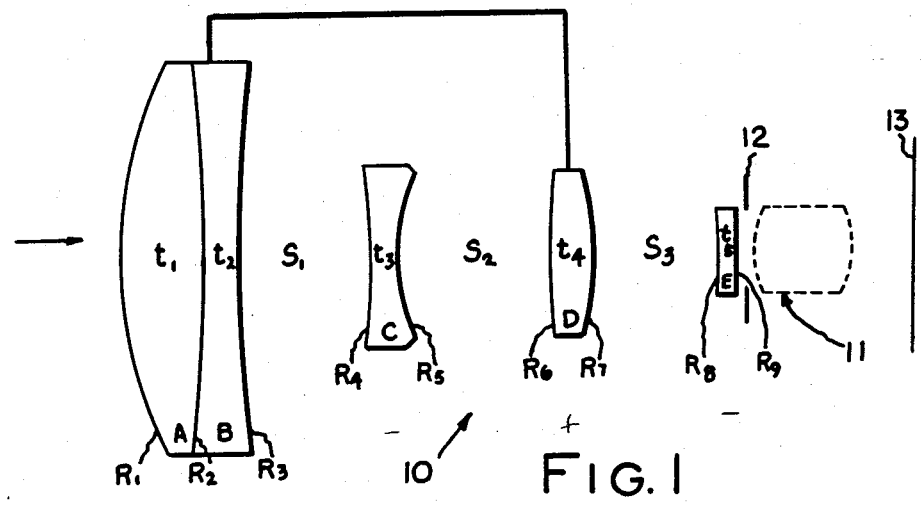

FIG. 1

| LENS | CURVATURES | THICKNESS | SPACINGS | $n_D$ | $V$ |
|------|------------|-----------|----------|-------|-----|
| A | $R_1 = 42.855$ | $t_1 = 8.0$ | $S_1$ {AT 0.683x = 2.0<br>AT 1.143x = 13.0<br>AT 2.14x = 25.5} | 1.691 | 54.8 |
| B | $R_2 = -180.3$<br>$R_3 = 161.44$ | $t_2 = 3.5$ | | 1.7506 | 27.8 |
| C | $R_4 = -67.92$<br>$R_5 = 20.137$ | $t_3 = 2.5$ | $S_2$ {AT 0.683x = 26.0<br>AT 1.143x = 15.0<br>AT 2.14x = 2.5} | 1.620 | 60.3 |
| D | $R_6 = 100.0$<br>$R_7 = -30.761$ | $t_4 = 4.0$ | | 1.691 | 54.8 |
| E | $R_8 = -51.523$<br>$R_9 = \infty$ | $t_5 = 1.5$ | $S_3$ {AT 0.683x = 1.0<br>AT 1.143x = 12.0<br>AT 2.14x = 24.5} | 1.720 | 42.0 |

MAGNIFICATION ZOOM RANGE = 0.68x to 2.14x
DIMENSIONS IN mm.

FIG. 2

JOHN M. SCHWARTZ
GEORGE F. ZIEGLER
*INVENTORS*

BY *Frank C. Parker*

*ATTORNEY*

United States Patent Office 2,984,155
Patented May 16, 1961

2,984,155
VARIABLE MAGNIFICATION AFOCAL OPTICAL SYSTEM

John M. Schwartz, Irondequoit, and George F. Ziegler, Rochester, N.Y., assignors to Bausch & Lomb Incorporated, a corporation of New York Filed Dec. 28, 1959, Ser. No. 862,270

2 Claims. (Cl. 88—57)

This invention relates to a variable magnification afocal optical system of the so-called zoom type which is used as an attachment for a photographic objective or the like and more particularly it relates to improvements in such a system wherein an optical compensation for the image shift is provided for all changes of power.

In the photographic arts, afocal pancratic optical systems of the optically compensated type having a zooming range sufficient to serve at the opposite ends of its range either as a telephoto attachment or a wide angle optical attachment for photographic objectives have been developed for objectives of moderate relative apertures. However much room for improvement exists in the development of such attachments for photographic objectives of very high relative aperture, particularly with regard to the attainment of a high degree of correction for chromatic and monochromatic aberrations of the image which is formed thereby.

It is an object of this invention to provide an improved variable magnification optically compensated afocal optical system of the zoom type for attachment to photographic objectives having a relative aperture as great as $f/1.8$, said optical system per se having a superior correction for chromatic and spherical image aberrations as well as having excellent correction for coma, astigmatism, distortion and field curvature.

It is a further object to provide such a device which is simple in structure and may be manufactured by low cost operations without sacrificing high grade performance qualities.

Further objects and advantages reside in the form and arrangement and details of construction of the component parts of said optical system as described in the specification herebelow and shown on the accompanying drawing wherein:

Fig. 1 is an optical diagram showing an optical attachment for a photographic objective or the like, said attachment being constructed according to our invention, and Fig. 2 is a chart of optical constructional data related to a preferred form of our invention.

A preferred form of this invention is shown in Fig. 1 of the drawing which shows an afocal zoom type of variable magnification optical system, generally designated by the numeral 10. Said optical system 10 is designed as an optically compensated afocal optical system for attachment to photographic objectives and the like which is shown schematically by dotted lines at 11. A suitable diaphragm 12 is provided between said objective 11 and the optical attachment 10.

The optical system 10 as shown comprises a doublet meniscus lens member AB which is convex toward the front or long conjugate side of the system, the front element A being of double convex form and the rear element B being of double concave form. Lens member AB has positive power. Optically aligned rearwardly thereof in the order named is a double concave lens C of negative power, a double convex lens D of positive power, and a plano-concave lens E of negative power.

For the purpose of changing magnification of the image progressively between the two limiting values of substantially $0.6\times$ to $2.2\times$ while maintaining the position of the image substantially stationary at the focal plane 13, the positive lenses AB and D are rigidly connected together and are movably mounted for axial motion. The adjacent lenses C and E are mounted in a fixed position.

According to this invention, advantageous performance characteristics are obtained in this zoom system by a well calculated distribution of the powers of the individual lens members AB, C, D and E. The power of the C lens is equal to between .25 times and .32 times the power of the AB lens. Furthermore, the power of the D lens is equal to between .36 times to .45 times the power of the AB lens and the power of the E lens is equal to between .76 times to .94 times the power of the AB lens. With the above described distribution of powers of the lens members, the AB lens works at 1.73 magnification when the optical system 10 produces unity magnification and under this condition, the C lens works at 0.37 magnification, the D lens works at 1.66 magnification, and the E lens works at 0.94 magnification.

An excellent state of correction for chromatic aberration is achieved by using a properly calculated equivalent Abbe number for the compound AB lens. "The equivalent Abbe number" $\nu e$ is calculated by taking into account not only the $\nu$ values of the individual lens elements A and B, but also the refractive index and powers thereof as suggested for instance by F. D. Cruickshank of the Department of Physics of the University of Tasmania in his short manuscript dated Oct 16, 1957 and entitled "The Design of Photographic Objectives of the Triplet Family," as reported in Australian Journal of Physics, vol. II, No. 1, March 1958, pp. 42–43.

As a result of calculation and experiment, it has been discovered that the best range of values for the "equivalent Abbe number" for the AB lens of the present optical system lies between 190.0 and 285.0 whereby a fine state of chromatic correction of said lens is provided. The optimum value of equivalent Abbe number for an optical system constructed according to the optical data in Fig. 2 is about 273. Calculation and experiment reveal that as the equivalent Abbe number becomes larger, the state of correction of chromatic aberrations improves correspondingly.

In achieving an excellent state of correction of the monochromatic image errors, the radius of curvature of the refractive lens surfaces, the axial thickness of the lens parts and their varying spacings are prescribed by the following statement of inequalities.

$$.30R_3 > +R_1 > .24R_3$$
$$.33R_4 > +R_5 > .26R_4$$
$$.34R_6 > -R_7 > .27R_6$$
$$.1129F_{AB} > t_1 > .0841F_{AB}$$
$$.0449F_{AB} > t_2 > .0367F_{AB}$$
$$.0321F_{AB} > t_3 > .0263F_{AB}$$
$$.0514F_{AB} > t_4 > .0320F_{AB}$$
$$.0193F_{AB} > t_5 > 0.157F_{AB}$$
$$.130F_{AB} > S_1 > .106F_{AB}$$
$$.230F_{AB} > S_2 > .188F_{AB} \quad \text{when optical system 10 produces unity magnification.}$$
$$.117F_{AB} > S_3 > .095F_{AB}$$

where $R_1$ to $R_9$ represent the refractive lens curvatures of the lens elements A, B, C, D and E respectively, $t_1$ to $t_5$ represent the axial thickness of the lens elements, $S_1$ to $S_3$ represent the variable spaces between the lenses AB, C, D, and E, and $F_{AB}$ is the focal length the AB lens per se.

In order to maintain a high standard of correction for lens aberrations, it is necessary that the refractive index of the D lens must be at least .07 greater than the refractive index of lens C and refractive index of lens E must be at least .02 greater than the refractive index of the D lens.

The constructional data for describing one successful from of our afocal optically compensated zoom system is given in the chart herebelow wherein A, B, C, D and E are the lens elements named in order from the front or long conjugate side of the system, $R_1$ to $R_9$ represents the refractive curvatures of the respective lenses, $t_1$ to $t_5$ represent the axial thicknesses thereof, $S_1$ to $S_3$ represent the variable spaces between the lenses AB, C, D and E, $n_D$ represents the refractive index and $\nu$ represents the reciprocal relative dispersion or Abbe number of the glasses from which said elements are made.

[Dimensions Are Given in mm. Magnification Range=0.68× to 2.14×]

| Lens | Curvatures | Thickness | Spacing | $n_D$ | $\nu$ |
|---|---|---|---|---|---|
| A | $R_1=42.855$ | $t_1=8.0$ | | 1.691 | 54.8 |
| B | $R_2=-180.3$ | $t_2=3.5$ | | 1.7506 | 27.8 |
| | $R_3=161.44$ | | $S_1\begin{cases}\text{at }0.683\times=2.0\\\text{at }1.143\times=13.0\\\text{at }2.14\times=25.5\end{cases}$ | | |
| C | $R_4=-67.92$ | $t_2=2.5$ | | 1.620 | 60.3 |
| | $R_5=20.137$ | | $S_2\begin{cases}\text{at }0.683\times=26.0\\\text{at }1.143\times=15.0\\\text{at }2.14\times=2.5\end{cases}$ | | |
| D | $R_6=100.0$ | $t_4=4.0$ | | 1.691 | 54.8 |
| | $R_7=-30.761$ | | $S_3\begin{cases}\text{at }0.683\times=1.0\\\text{at }1.143\times=12.0\\\text{at }2.14\times=24.5\end{cases}$ | | |
| E | $R_8=-51.523$ | $t_5=1.5$ | | 1.720 | 42.0 |
| | $R_9=\infty$ | | | | |

Although only one specific form of our invention has been shown and described in detail, other forms may be constructed and changes may be made in the details and specifications of the parts without departing from the spirit of this invention as defined in the claims herebelow.

We claim:
1. A variable magnification afocal zoom optical system of the optically compensated type for attachment to a photographic objective having a relative aperture as great as f/1.8, said system comprising a movable meniscus doublet lens which is convex toward the front, a stationary double concave single lens, a movable double convex lens, and a rearmost stationary plano-concave lens all being optically aligned in the order named, said movable lenses being connected together for like movements with respect to the stationary lenses whereby an image of continuously variable size is formed thereby which remains substantially axially stationary throughout a range of magnifications between 0.6× and 2.2×, the successive lenses from front to rear working respectively at 1.73×, −0.37×, 1.60× and −0.94× when said system produces unity magnification, the numerical construction data for said system being defined by the following statements of inequalities wherein $R_1$ to $R_9$ represent the radii of the lens surfaces, $t_1$ to $t_5$ represent the thickness of the lens elements A to E, $S_1$ to $S_3$ represent the variable spaces between the lenses, "Equiv. $\nu$" represents the equivalent Abbe number, $n_D$ represents the refractive index of the respective lens elements, and $F_{AB}$ represents the focal length of the front lens member AB,

$.55F_{AB} > +R_1 > .45F_{AB}$
$2.2F_{AB} > -R_2 > 2.0F_{AB}$
$1.95F_{AB} > +R_3 > 1.75F_{AB}$
$.85F_{AB} > -R_4 > .75F_{AB}$
$.25F_{AB} > +R_5 > .21F_{AB}$
$1.2F_{AB} > +R_6 > 1.1F_{AB}$
$.40F_{AB} > -R_7 > .32F_{AB}$
$.7F_{AB} > -R_8 > .5F_{AB}$
$R_9 > \pm 100.F_{AB}$
$.098F_{AB} > t_1 > .090F_{AB}$
$.044F_{AB} > t_2 > .038F_{AB}$
$.032F_{AB} > t_3 > .027F_{AB}$
$.050F_{AB} > t_4 > .042F_{AB}$
$.025F_{AB} > t_5 > .017F_{AB}$
$.130F_{AB} > S_1 > .106F_{AB}$
$.23F_{AB} > S_2 > .188F_{AB}$  when optical system 10 is working at 1.0×
$.117F_{AB} > S_3 > .095F_{AB}$
$n_D(A)=1.6910$
$n_D(B)=1.7506$
$n_D(C)=1.620$
$n_D(D) > n_D(C) + .07$
$n_D(E) > n_D(D) + .02$
Equiv. $\nu_{AB}=190$ to $240$ 2. An afocal variable magnification optical system of the optically compensated zoom type for attachment to a photographic objective having a relative aperture as large as f/1.8, said system comprising a movable front meniscus doublet lens of positive power which is convex toward the front of the system, a stationary double concave single lens of negative power, a movable double convex lens of positive power and a rear stationary plano concave single lens of negative power, all of said lenses being optically aligned in the order named, said movable lenses being connected together for duplicate movements with respect to the stationary lenses so that an image of continuously and progressively variable size may be formed at a substantially stationary position for all magnifications of the system, the constructional data for said system being specified in the table herebelow, wherein $R_1$ to $R_9$ designate the radii of curvature of the refractive surfaces, $t_1$ to $t_5$ designate the axial thicknesses of the individual lens elements, $S_1$ to $S_3$ designate the variable axial spacings between said elements, $n_D$ represents the refractive index and $\nu$ represents the Abbe number of the respective lens elements.

[All Dimensions in Millimeters. Magnification Range=0.68× to 2.14×]

| Lens | Curvatures | Thickness | Spacing | $n_D$ | $\nu$ |
|---|---|---|---|---|---|
| A | $R_1=42.855$ | $t_1=8.0$ | | 1.691 | 54.8 |
| B | $R_2=-180.3$ | $t_2=3.5$ | | 1.7506 | 27.8 |
| | $R_3=161.44$ | | $S_1\begin{cases}\text{at }0.683\times=2.0\\\text{at }1.143\times=13.0\\\text{at }2.14\times=25.5\end{cases}$ | | |
| C | $R_4=-67.92$ | $t_2=2.5$ | | 1.620 | 60.3 |
| | $R_5=20.137$ | | $S_2\begin{cases}\text{at }0.683\times=26.0\\\text{at }1.143\times=15.0\\\text{at }2.14\times=2.5\end{cases}$ | | |
| D | $R_6=100.0$ | $t_4=4.0$ | | 1.691 | 54.8 |
| | $R_7=-30.761$ | | $S_3\begin{cases}\text{at }0.683\times=1.0\\\text{at }1.143\times=12.0\\\text{at }2.14\times=24.5\end{cases}$ | | |
| E | $R_8=-51.523$ | $t_5=1.5$ | | 1.720 | 42.0 |
| | $R_9=\infty$ | | | | |

References Cited in the file of this patent
UNITED STATES PATENTS
2,925,010   Turula et al. _____ Feb. 16, 1960